United States Patent
Martens et al.

(10) Patent No.: US 11,491,432 B2
(45) Date of Patent: Nov. 8, 2022

(54) FILTER ASSEMBLY FOR SEPARATING LIQUID FROM COMPRESSED GAS AND COMPRESSOR COMPRISING SUCH FILTER ASSEMBLY

(71) Applicant: ATLAS COPCO AIRPOWER, NAAMLOZE VENNOOTSCHAP, Wilrijk (BE)

(72) Inventors: Kristof Adrien Laura Martens, Wilrijk (BE); Steven Maurits Ray Laurent, Wilrijk (BE); Joris Anna L. Vleeschouwer, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 229 days.

(21) Appl. No.: 16/627,125

(22) PCT Filed: Jun. 11, 2018

(86) PCT No.: PCT/IB2018/054203
§ 371 (c)(1),
(2) Date: Dec. 27, 2019

(87) PCT Pub. No.: WO2019/016626
PCT Pub. Date: Jan. 24, 2010

(65) Prior Publication Data
US 2021/0146290 A1      May 20, 2021

Related U.S. Application Data

(60) Provisional application No. 62/533,842, filed on Jul. 18, 2017.

(30) Foreign Application Priority Data
Mar. 15, 2018    (BE) .................................. 2018/5157

(51) Int. Cl.
*B01D 46/24* (2006.01)
*B01D 46/00* (2022.01)
(Continued)

(52) U.S. Cl.
CPC ..... *B01D 46/2414* (2013.01); *B01D 46/0005* (2013.01); *B01D 46/58* (2022.01);
(Continued)

(58) Field of Classification Search
CPC .... B01D 27/08; B01D 46/0005; B01D 35/30; B01D 46/24; B01D 46/00; F04D 29/70
See application file for complete search history.

(56) References Cited

U.S. PATENT DOCUMENTS

| | | | |
|---|---|---|---|
| 2011/0296999 A1* | 12/2011 | Foerster | B01D 46/0039 96/417 |
| 2016/0256813 A1* | 9/2016 | Dworatzek | B01D 46/0005 |
| 2019/0184322 A1* | 6/2019 | Cools | F01D 25/04 |

FOREIGN PATENT DOCUMENTS

| | | |
|---|---|---|
| EP | 1 967 247 A1 | 9/2008 |
| JP | 2004-136203 A | 5/2004 |

(Continued)

OTHER PUBLICATIONS

International Search Report of PCT/IB2018/054203 dated Sep. 17, 2018 [PCT/ISA/210].
(Continued)

*Primary Examiner* — Robert A Hopkins
*Assistant Examiner* — Qianping He
(74) *Attorney, Agent, or Firm* — Sughrue Mion, PLLC

(57) ABSTRACT

A filter assembly including a housing (15) and a filter cartridge (10). The housing has a housing inlet (16) and a housing outlet (17). The filter cartridge (10) has a filter inlet (11) fluidly connected to the housing inlet (16) and a filter element (12) between a top cap (18) and a bottom cap (19).

(Continued)

The top cap (18) and the bottom cap (19) create a circular guiding system. The bottom cap (19) has a first part (19a) that receives the filter element (12) and a second part (19b) that is connected with a mating surface (20) of the housing. The second part has a first circular section (21a) and a second section (21b) and the first section has another shape than the second section (21b), such that the bottom cap (19) cannot rotate in relation to the mating surface.

17 Claims, 8 Drawing Sheets

(51) Int. Cl.
  *F04D 29/70* (2006.01)
  *B01D 46/58* (2022.01)
(52) U.S. Cl.
  CPC ...... *F04D 29/701* (2013.01); *B01D 2265/021* (2013.01); *B01D 2265/026* (2013.01); *B01D 2273/28* (2013.01)

(56) References Cited

FOREIGN PATENT DOCUMENTS

| | | | | |
|---|---|---|---|---|
| JP | 2004136203 A | * | 5/2004 | ............ B01D 29/21 |
| WO | 2010/070102 A1 | | 6/2010 | |
| WO | 2010/117799 A2 | | 10/2010 | |

OTHER PUBLICATIONS

Written Opinion of PCT/IB2018/054203 dated Sep. 17, 2018 [PCT/ISA/237].
Written Opinion of the International Preliminary Examining Authority of PCT/IB2018/054203 dated Aug. 6, 2019 [PCT/IPEA/408].
International Preliminary Report on Patentability of PCT/IB2018/054203 dated Oct. 21, 2019 [PCT/IPEA/409].

* cited by examiner

FILTER ASSEMBLY FOR SEPARATING LIQUID FROM COMPRESSED GAS AND COMPRESSOR COMPRISING SUCH FILTER ASSEMBLY

CROSS REFERENCE TO RELATED APPLICATIONS

This application is a National Stage of International Application No. PCT/IB2018/054203, filed Jun. 11, 2018, claiming priority to U.S. Provisional Application No. 62/533,842, filed Jul. 18, 2017 and Belgian Application No. 2018/5157 filed Mar. 15, 2018.

BACKGROUND OF THE INVENTION

Field of the Invention

This invention relates to a filter assembly comprising a housing and a filter cartridge for separating liquid from compressed gas, the filter cartridge being provided within the housing, said housing comprising:
 a housing inlet adapted to be fluidly connected to a compressed gas outlet and
 a housing outlet, wherefrom purified gas is retrieved
the filter cartridge comprising a filter inlet fluidly connected to said housing inlet and a filter element provided between a top cap and a bottom cap which also make part of said filter cartridge, said bottom cap comprising said filter inlet, whereby the top cap and the bottom cap create a circular or predominantly circular guiding system for mounting said filter element, and whereby the bottom cap further comprises a first part receiving the filter element and a second part connected to a mating surface of said housing.

Background

Liquid separating filters are widely used within compressors or vacuum pumps. Whether they are used for providing purified gas to the environment or to an external network, these liquid separating filters are very important components which need to be maintained in a good functioning state in order to meet strict environmental regulations or for not damaging the external network or its products.

Such liquid separating filters need to be changed whenever a fault is registered with the amount of liquid present at the outlet of the system or the external network Since such a servicing procedure implies additional costs relating to the liquid separating filter itself but also because the compressor or vacuum pump is stopped during the procedure, a user of such system would like to be confronted with a replacement of such liquid separation filter as rarely as possible, but without compromising the quality of the system.

Known liquid separating filters fail to offer a very long lifetime due to the simple fact that the seal between the liquid separating filter and its mating surface easily gets damaged during the functioning of the compressor or vacuum pump.

Typically, such known liquid separating filters comprise a top cap and a bottom cap with a filter element in between, the bottom cap comprising the inlet through which gas comprising liquid is flowing. The connection of the liquid separating filter to a mating surface of a housing connected to the source of gas being done through a radial seal sealing a circular connecting part.

While this radial seal might function well, tests have shown that it wears very fast due to the vibrations and movement induced to the liquid separation filter.

The liquid separation filters end up rotating around their axis during the functioning of the compressor or vacuum pump, which movement easily damages such a seal.

Consequently, the material from which the seal is made and also the shape of the seal would have to be changed, or such a seal would need replacement very often, because such a seal turns from what was believed to be a static seal, into a static and dynamic seal, needing to withstand radial and axial forces.

However, even if the material of the seal or its shape would be changed, it would not solve the problem with such filter rotating around its axis and would only increase the complexity and costs associated with the liquid separation filter.

In EP 1.967.247, a compressed air filter comprising a filter element and an adapter related thereto have been described, whereby the adapter is delimited at a first end by a first opening configured to be fluidly connected with a filter connection housing and at another end by a second opening configured to be fluidly connected to the filter element.

The first end of the adapter is configured to be fluid-tightly fit into an opening in the filter connection housing.

The surface along which the first end fits with the filter connection housing has a non-circular transverse section, such that this first end cannot rotate in the filter connection housing once it is mounted into the filter connection housing.

In JP 2004-136203, a filter comprising a filter element has been described, whereby a disk-shaped upper plate of the filter element with a central filter inlet opening can be easily and nonrotatively fixed into an upper case half body of the filter housing.

One or more locking projections are provided internally at an inner peripheral side of the filter inlet opening, and one or more corresponding recesses are provided on an outer peripheral side of a tube arranged centrally on the upper case half body, such that the upper plate cannot rotate with respect to the upper case half body once it is fixed.

Taking the above drawbacks into account, it is an object of the present invention to provide a liquid separation filter not allowing a rotational movement around its axis, having a simpler layout and not increasing the manufacturing costs thereof.

Furthermore, the present invention aims at providing a liquid separating filter that would be very durable and easy to mount during the servicing procedure.

SUMMARY OF THE INVENTION

The present invention solves at least one of the above and/or other problems by providing a filter assembly comprising a housing and a filter cartridge for separating liquid from compressed gas, the filter cartridge being provided within the housing, said housing comprising:
 a housing inlet adapted to be fluidly connected to a compressed gas outlet and,
 a housing outlet, wherefrom purified gas is retrieved,
the filter cartridge comprising a filter inlet fluidly connected to said housing inlet and a filter element provided between a top cap and a bottom cap which are also part of the filter cartridge, said bottom cap comprising said filter inlet, whereby the top cap and the bottom cap create a circular or predominantly circular guiding system for mounting said filter element, and whereby the bottom cap further comprises a first part receiving the filter element and a second part connected to a mating surface of the housing characterised in that the second part comprises a first section and a second section; and that the first section has another shape than the second section, such that the bottom cap cannot rotate in relation to the mating surface. Because the second part comprises a second section which is received by the mating surface of the housing, a rotating movement of the filter cartridge around its axis is prevented.

Furthermore because of such second section the mounting of the filter cartridge into the housing is very easy, the filter cartridge being allowed to be mounted in the mating surface in a controlled position.

By adopting such a layout, the manufacturing costs are in fact kept low and the lifetime of the filter cartridge is increased by eliminating the additional wear on the sealing between the filter cartridge and the housing.

Said liquid can for example, but not necessarily, be oil. The invention is not limited to this. The liquid could also be water.

Preferably, a seal is mounted on the second part, said seal being between the second part and the mating surface, when the filter cartridge is in a mounted state.

Because of the elimination of the rotating movement, the seal between the filter cartridge and the housing is maintained as a static seal, eliminating the need of a more durable and more expensive seal.

The present invention is further directed to a liquid separation vessel provided with a filter cartridge for separating liquid from gas, the liquid separation vessel comprising:
- a vessel inlet adapted to be connected to a source of gas and,
- a vessel outlet, wherefrom purified gas is retrieved, the filter cartridge comprising a filter inlet fluidly connected to said vessel inlet and a filter element provided between a top cap and a bottom cap which make also part of said filter cartridge, said bottom cap comprising said filter inlet, whereby the top cap and the bottom cap create a circular or predominantly circular guiding system for mounting said filter element, and whereby the bottom cap further comprises a first part receiving the filter element and a second part connected to a mating surface of the liquid separation vessel characterised in that the second part comprises a first section and a second section; and that the first section has another shape than the second section, such that the bottom cap cannot rotate in relation to the mating surface.

The present invention is further directed to a compressor comprising a compressor element having a gas inlet and a compressed gas outlet, a liquid separation vessel provided on the compressed gas outlet, the liquid separation vessel having a vessel inlet fluidly connected to the compressed gas outlet and a vessel outlet providing purified gas, whereby the liquid separation vessel is provided with a filter cartridge comprising a filter inlet fluidly connected to the compressed gas outlet, the filter cartridge comprising a filter element provided between a top cap and a bottom cap which are also part of said filter cartridge, said bottom cap comprising said filter inlet, whereby the top cap and the bottom cap create a circular or predominantly circular guiding system for mounting said filter element, and whereby the bottom cap further comprises a first part receiving the filter element and a second part connected to a mating surface of the liquid separation vessel characterised in that the second part comprises a first section and a second section; and that the first section has another shape than the second section, such that the bottom cap cannot rotate in relation to the mating surface.

The present invention is also directed to a vacuum pump comprising a vacuum element having a vacuum inlet and an outlet, a liquid separation vessel provided on the outlet, the liquid separation vessel having a vessel inlet fluidly connected to the outlet and a vessel outlet providing purified gas, whereby the liquid separation vessel is provided with a filter cartridge comprising a filter inlet fluidly connected to the outlet, the filter cartridge comprising a filter element provided between a top cap and a bottom cap which are also part of said filter cartridge, said bottom cap comprising said filter inlet, whereby the top cap and the bottom cap create a circular or predominantly circular guiding system for mounting said filter element, and whereby the bottom cap further comprises a first part receiving the filter element and a second part connected to a mating surface of the liquid separation vessel characterised in that the second part comprises a first section and a second section; and that the first section has another shape than the second section, such that the bottom cap cannot rotate in relation to the mating surface.

The present invention is also directed to a use of a filter assembly according to the present invention for the liquid separation within a compressor or vacuum pump.

The present invention is also directed to a compressor comprising a compressor element having a gas inlet and a compressed gas outlet, a liquid separation vessel provided on the compressed gas outlet, the liquid separation vessel having a vessel inlet fluidly connected to the compressed gas outlet and a vessel outlet providing purified gas, whereby the compressor is provided with a filter cartridge comprising a filter inlet fluidly connected to the vessel outlet, the filter cartridge comprising a filter element provided between a top cap and a bottom cap which are also part of said filter cartridge, whereby the bottom cap comprises the filter inlet, whereby the top cap and the bottom cap create a circular or predominantly circular guiding system for mounting the filter element, and whereby the bottom cap further comprises a first part receiving the filter element and a second part connected to a mating surface of the vessel outlet or a conduit connected with the vessel outlet characterised in that the second part comprises a first section and a second section; and that the first section has another shape than the second section, such that the bottom cap cannot rotate in relation to the mating surface.

In the context of the present invention it should be understood that the benefits presented above with respect to the filter assembly are also valid for the liquid separation vessel, the compressor, the vacuum pump and the use of the filter assembly.

BRIEF DESCRIPTION OF THE DRAWINGS

With the intention of better showing the characteristics of the invention, some preferred embodiments according to the present invention are described hereinafter by way of an example, without any limiting nature, with reference to the accompanying drawings, wherein.

DETAILED DESCRIPTION OF THE INVENTION

Figure 1:
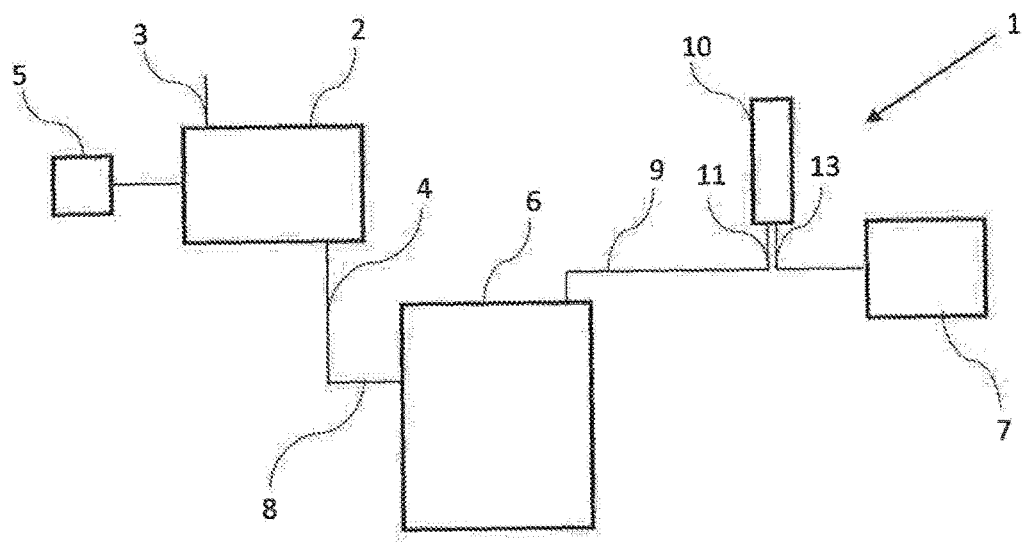
FIGS. 1 to 3 schematically illustrate a compressor according to different embodiments of the present invention.

FIG. 1 illustrates a compressor 1 comprising a compressor element 2 having a gas inlet 3 and a compressed gas outlet 4. The compressor element 2 being driven by a fixed speed or variable speed motor 5.

In the context of the present invention, the compressor 1 should be understood as the complete compressor installation, including the compressor element 2, all the typical connection pipes and valves, the housing of the compressor 1 and possibly the motor 5 driving the compressor element 2.

In the context of the present invention, the compressor element 2 should be understood as the compressor element casing in which the compression process takes place by means of a rotor or through a reciprocating movement.

Further, said compressor element 2 can be selected from a group comprising: a screw, a tooth, a claw, a scroll, a rotary vane, a centrifugal, a piston, etc.

Returning now to FIG. 1, the compressor 1 further comprises a separation vessel 6 provided on the compressed gas outlet 4, the separation vessel 6 separating the liquid from compressed gas before such compressed gas reaches the user's network 7. The separation vessel 6 comprises a vessel inlet 8 fluidly connected to the compressed gas outlet 4 and a vessel outlet 9 fluidly connected to the user's network 7.

The aforementioned liquid being oil or any other liquid injected within the compressor element 2 and used for its cooling and/or lubricating properties.

In a preferred embodiment but not limiting thereto, the compressor 1 is an oil injected compressor.

For removing the fine liquid particles from the compressed gas, the compressor 1 can further comprise a filter cartridge 10 mounted on the vessel outlet 9.

In such a case, the vessel outlet 9 comprises a conduit connectable to the filter inlet 11.

The compressed gas typically flows through the filter element 12, and the clean filtered gas is further directed through a filter outlet 13 and further to the user's network 7 or to an external network.

Figure 2:
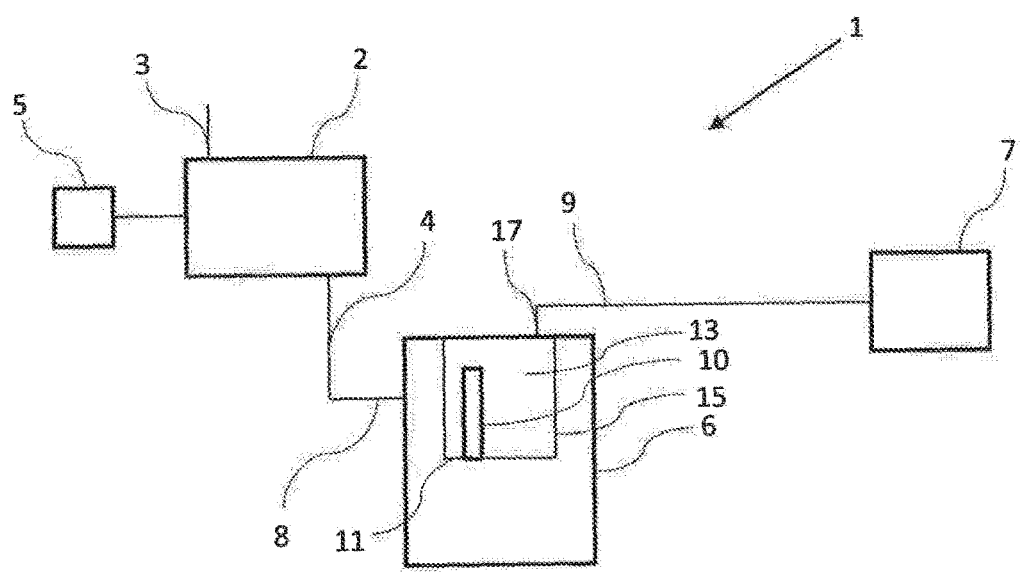

In another embodiment according to the present invention, as illustrated in FIG. 2, the filter cartridge can be mounted within the separation vessel 6. The compressed gas can in such a case be directed through the vessel inlet 8, through the filter inlet 11 and further through the vessel outlet 9, after said compressed gas would have passed through the filter element 12.

In yet another embodiment according to the present invention and not limiting thereto, the separation vessel 6 can comprise a plurality of filter cartridges 10 mounted therein.

Figure 4:
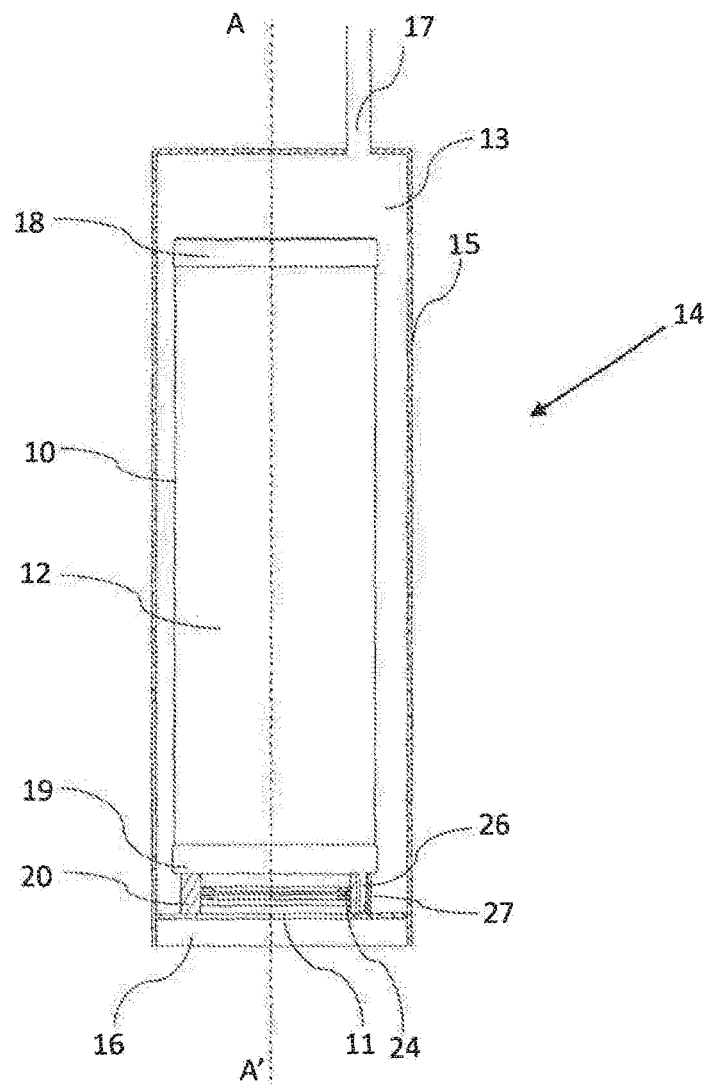
FIG. 4 schematically illustrates a cross-section of a filter assembly according to one embodiment of the present invention.

Further, the present invention aims at providing a filter assembly 14 comprising a housing 15 and a filter cartridge 10 for separating oil from compressed gas, the filter cartridge 10 being provided within the housing 15, as illustrated in FIG. 4.

Figure 3:
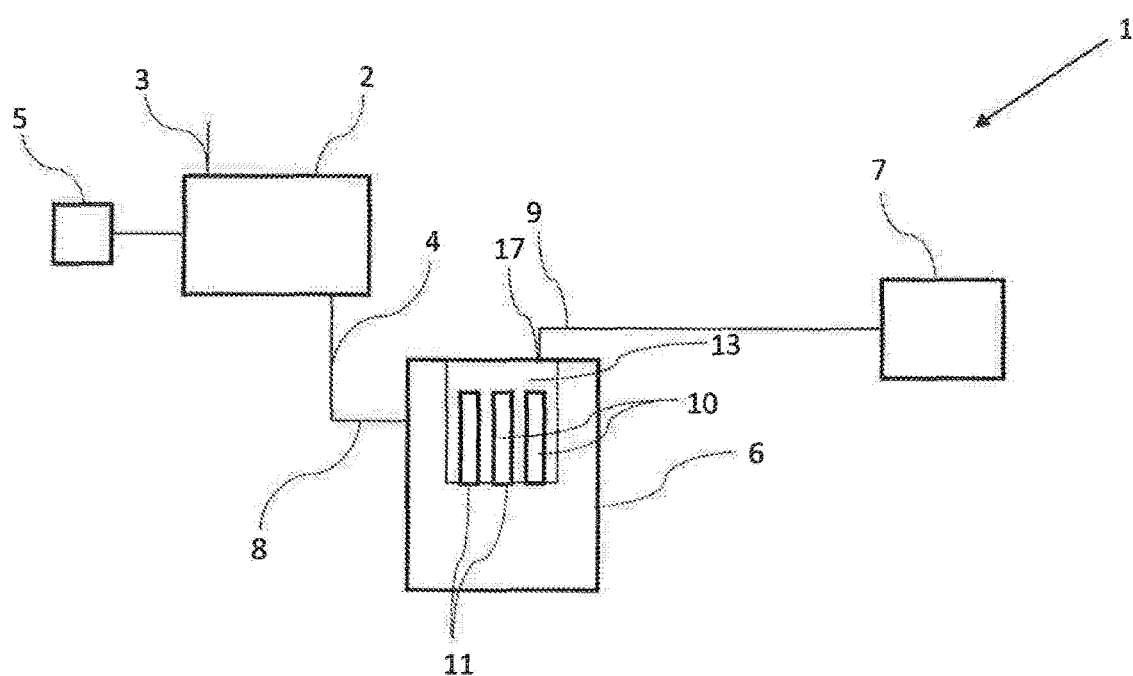

The housing 15 is either the housing in which the filter cartridge 10 is provided when such filter cartridge 10 is provided on the vessel outlet 9, or the chamber provided within the separation vessel 6, such chamber receiving the filter cartridge 10 or filter cartridges 10, as illustrated in FIGS. 2 and 3.

The housing further comprises a housing inlet 16 adapted to be fluidly connected to a compressed gas outlet 4 and, a housing outlet 17, wherefrom purified gas is retrieved Such housing outlet 17 can correspond to the filter outlet 13 of FIG. 1, or it can be fluidly connected to such filter outlet 13; or such housing outlet 17 can correspond to the vessel outlet 9 of FIGS. 2 and 3 or be fluidly connected to it.

Further, the filter inlet 11 is fluidly connected to said housing inlet 16.

The filter cartridge further comprises the filter element 12, said filter element 12 being provided between a top cap 18 and a bottom cap 19 which is also part of the filter cartridge 10.

The top cap 18 and the bottom cap 19 create a circular or predominantly circular guiding system for mounting said filter element 12. In other words, the top cap 18 and the bottom cap 19 keep the filter element 12 in the desired position.

Consequently, the filter element, in a mounted state between the top cap 18 and the bottom cap 19 will create a cylindrical or predominantly cylindrical hollow structure.

The present invention should not be limited to a circular or predominantly circular shape for the cross-section of the filter, but it should be understood that other shapes are possible as well without departing from the scope of the invention, such as selected from a group comprising: a triangular, a hexagonal, an oval, a rectangular or any other shape in the cross-section, the filter preferably creating a hollow structure in its centre.

Returning to the filter cartridge 10, the bottom cap 19 comprises the filter inlet 11 and allows compressed gas to enter within the central part of the cylindrical or predominantly cylindrical hollow structure. The compressed gas passes through the filter element 12 in order to reach the filter outlet 13.

When the compressed gas passes through the filter element 12, the majority of the liquid particles potentially present in the compressed gas are trapped within the filter element 12, and clean or relatively purified gas flows through the filter outlet 13.

Figure 5A:
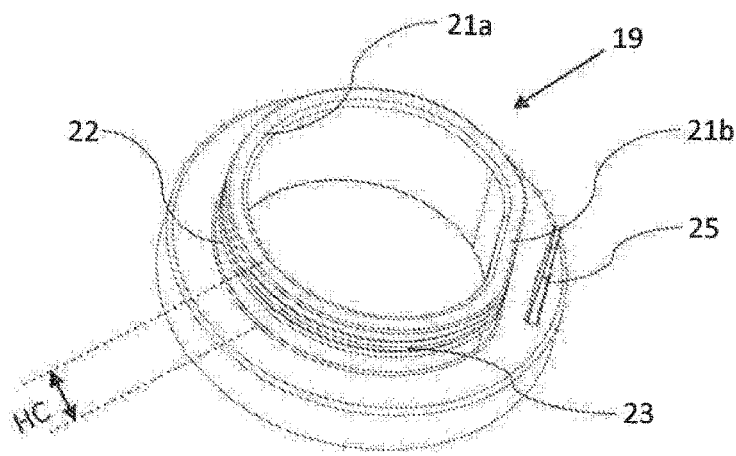
FIGS. 5a and 5b schematically illustrates a bottom cap according to an embodiment of the present invention, with FIG. 5a illustrating a top, slightly inclined view and FIG. 5b illustrating a lateral view.
Figure 5B:
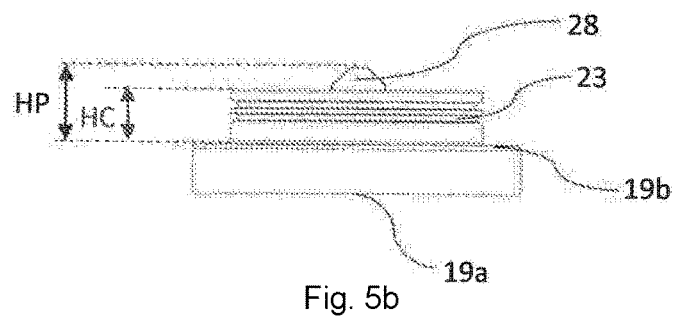

The bottom cap 19 further comprises a first part 19a receiving the filter element 12 and maintaining it in the desired shape and position, and a second part 19b connected to a mating surface 20 of said housing 15, as illustrated in FIGS. 5a and 5b.

The mating surface 20 typically comprises a section of a complementary shape with the second part 19b such that the mating surface will allow the second part 19b to be typically received in a desired position, assuring a correct mounting of the filter cartridge 10.

To achieve a robust and durable filter cartridge 10, the mating surface 20 comprises a complementary shape of the complete second part 19b, enlarging the contact surface between the bottom cap 19 and said mating surface 20.

By adopting such a layout, the sealing properties of the filter cartridge 10 are enhanced as well, since a tilting movement of said filter cartridge during the functioning or even during the mounting procedure is not allowed and consequently, compressed gas is not allowed to escape between the second part 19b and the mating surface 20 and reach the filter outlet 13 without being filtered by the filter element 12. Said tilting creates an angle between the desired axis AA' while the filter cartridge 10 is in a mounted state and the axis of the filter cartridge while in a tilted position, said angle being encountered at the intersection between the two axes.

Referring to FIGS. 5a and 5b, typically, the second part 19b comprises an axially projecting rim 22 having a height HC, being of a circular or oval shape and created around an opening, said opening being the filter inlet 11. Consequently, the mating surface 20 will also comprise a section of a circular or oval shape as well, matching the height HC, the shape and the diameter of the rim 22.

The rim 22 going over the mating surface 20 or the mating surface 20 going over the rim 22.

The connection between the rim 22 and the mating surface 20 is done through any technique such as for example and not limiting thereto: sliding, snap-fit, screwing, or any other technique.

Preferably, the second part 19b is detachably connected with the mating surface 20. This is independent from the fact whether the second part 19b is provided or not with a rim 22.

Preferably, the second part 19b comprises a first section 21a and a second section 21b. For restricting the rotational movement of the filter cartridge while the compressor element 2 is running, the second section 21b has a different shape to the first section 21a. Consequently, the bottom cap 19 cannot rotate in relation to the mating surface 20.

In this case, but not necessarily the first section 21a is circular and the second section 21b is not circular.

Said second section 21b is part of the rim 22 or a part of the surface of the second part 19b.

In a preferred embodiment according to the present invention, the second section 21b is of a relatively reduced area in comparison with the circumference of the second part 19b. The second section 21b has a different shape to the rest of the second part 19b or a cross-section through it.

In the context of the present invention, circular refers to a surface with a cross-section defining a circle or an arch of a circle and therefore having a constant radius.

The rim 22 has an inner surface and an outer surface. If the mating surface 20 goes over the rim 22, the outer surface can comprise the non-circular second section 21b.

It is also possible for the inner surface to comprise the second section 21b. It is further possible for the inner surface and the outer surface to be parallel to each other and consequently both comprise the second section 21b.

If the mating surface 20 goes over the rim 22, the mating surface 20 preferably covers the second part 19b including the rim 22. In other words; the mating surface 20 has a shape complementary to the shape of the second part 19b Consequently, the mating surface 20 will also comprise a second section 21b which is brought into contact with the section 21b of the second part 19b when the filter cartridge 10 is mounted.

In an embodiment according to the present invention, the rim 22 comprises at least a channel or groove 23 along its circumference for receiving a seal 24 therein. The seal 24 assures that leakage of gas between the second part 19b and the mating surface 20 is avoided.

In another embodiment according to the present invention, for an even more reliable sealing, the rim 22 comprises two or more channels or grooves 23, each of said channels 23 receiving a seal 24 therein.

The seal can be any type of seal, such as for example and not limiting thereto: an O-ring, U-cup seal, a seal already vulcanised within the channel(s) 23, or the like. Such seals can be created from any material such as selected from a group comprising: natural or synthetic rubber, any type of polymer, plastic or ceramic material or any other material.

It would also be possible to place the seal(s) 24 in the mating surface 20 by providing channels or one or more grooves in this mating surface. Preferably but not limiting thereto, the first section 21a has a relatively circular or oval shape.

Even more preferably, the second section 21b can have a different radius than the first section 21a or said second section 21b can be non-circular.

Such a feature keeps the manufacturing costs low, since the typical shape of a filter inlet 11 would be round.

Consequently, the alterations made to the second part 19b and the mating surface 20 are minimal, solving in a very cost-effective manner the problem of the filter cartridge 10 rotating around its axis when the compressor element 2 is running and without significantly affecting the initial layout of the filter cartridge.

Moreover, the flow section of the inner surface of the rim 22 in only reduced by a very restricted extent by such characteristic, which keeps the extra pressure loss of the recipient gas in the filter inlet 11 of the filter cartridge by such characteristic very restricted.

Figure 8A:
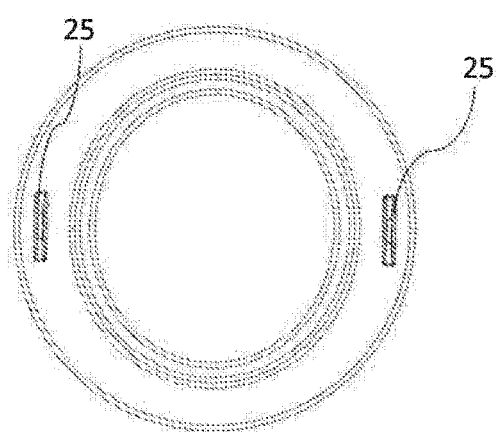
Figure 8B:
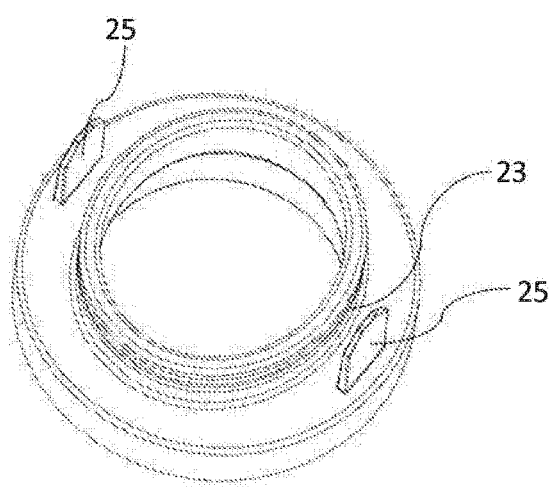

As illustrated in FIGS. 8a and 8b, the second part 19b can define an oval or predominately oval shape in the circumference of the filter inlet 11. For such a case, the second part 19b can comprise a second section 21b, or a part of such cross-section can be considered a second section 21b.

For mounting the filter cartridge in a very fast and easy way, the bottom cap 19 comprises a self-aligning unit 25.

Because of the existence of the second section 21b, the filter cartridge 10 needs to be oriented such that the second section 21b meets the complementing section on the mating surface 20. Consequently, the self-aligning unit 25 acts as a guiding unit for the mounting of the filter cartridge 10. The self-aligning unit 25 is received in a groove of the mating surface 20 with a complementary shape.

Such a layout allows an easier mounting procedure even when the mating surface and the filter inlet 11 are not visually accessible during the mounting. It also prevents the filter cartridge 10 getting stuck or even damaged due to a wrong inclination of the filter cartridge 10 or due to a wrong position of the second section 21b relative to the position of the complementary section of the mating surface 20.

In an embodiment according to the present invention, the self-aligning unit 25 can be created parallel to the axis AA' of the filter cartridge 10.

It is also possible for such self-aligning unit 25 to be created on a direction perpendicular or relatively perpendicular to the axis AA', or even under an angle with respect to the axis AA'.

Preferably, but not limiting thereto, the self-aligning unit 25 is provided on the second part 19b.

In another embodiment according to the present invention, the self-aligning unit 25 is provided on the mating surface 20, and the groove with a complementary shape is provided on the second part 19b.

In a preferred embodiment according to the present invention but not limiting thereto, the self-aligning unit 25 forms an integral part of the bottom cap 19.

In such a case, the bottom cap 19 is manufactured such to comprise the self-aligning unit 25, such as for example through casting or 3D printing.

Such a technique can provide a higher structural strength to the filter cartridge 10, allowing it to withstand higher pressures and forces during the functioning of the compressor 1.

However, it should not be excluded that such self-aligning unit 25 can be attached to the bottom cap 19 through any process such as selected from a group comprising: pressing, gluing, welding, screwing, bolting or any other process.

Furthermore, the top cap 18 and the bottom cap 19 can be manufactured from any type of material withstanding the pressures typically encountered within a compressor 1, such as selected from a group comprising: any type of plastic with or without reinforced fibres such as glass fibre combined or not with carbon fibre, any type of metal, or a ceramic, or the like.

In another embodiment according to the present invention, the self-aligning unit 25 is positioned between the rim 22 and the outer contour of the bottom cap 19.

However, the present invention should not be limited to such a location for the self-aligning unit 25, and it should be understood that the self-aligning unit 25 can be positioned at any location on the surface of the second part 19b, such as for example: between the second section 21b and the outer contour of the bottom cap 19, on the outer contour of the bottom cap 19, or any other location.

If the self-aligning unit 25 is positioned on the mating surface 20, then the groove receiving the self-aligning unit 25 can be positioned at any location on the surface of the second part 19b, corresponding of course with the position of the self-aligning unit 25.

In a preferred embodiment according to the present invention but not limiting thereto, the self-aligning unit 25 comprises a protruding segment 26.

Preferably but not limiting thereto, the protruding segment 26 has a height HP larger than the height HC of the rim 22, allowing for an easier orientation of the second section 21b before the rim 22 reaches the mating surface 20.

Preferably but not limiting thereto, the protruding segment 26 is positioned on the second part 19b, between the rim 22 and the outer contour of said second part 19b.

Said protruding segment 26 is positioned between the non-circular section 21 and the outer contour or in another location of the second part 19b.

Figure 12A:
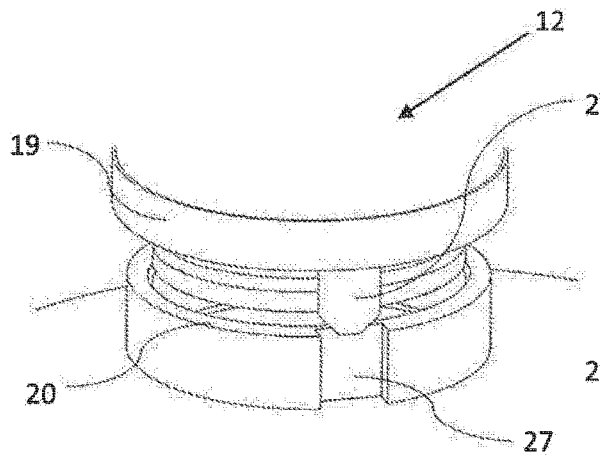
FIGS. 12a-12c schematically shows a bottom cap according to different embodiments, with a corresponding mating surface.
Figure 12B:
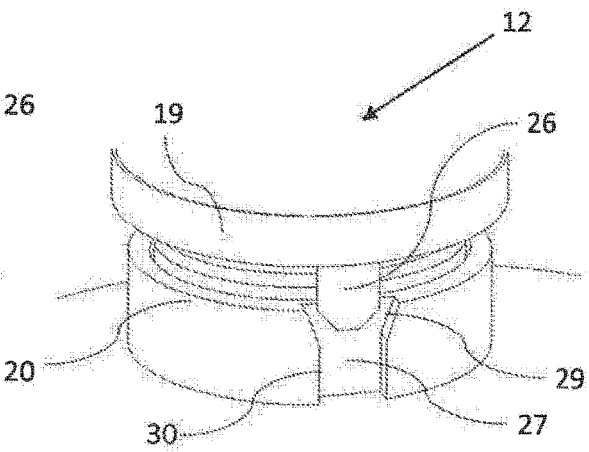
Figure 12C:
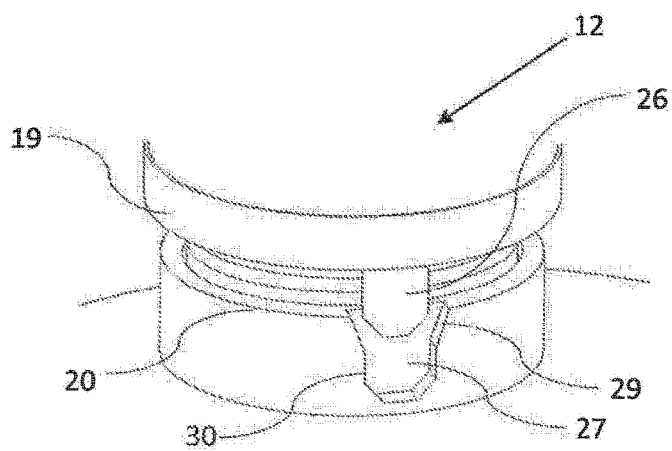

Preferably, as shown on FIGS. 12a-12c, the mating surface 20 comprises a retracted segment 27 for receiving the protruding segment 26.

The retracted segment 27 should be seen as a groove or channel made in either the second part 19b or the mating surface 20.

The protruding segment 26 should be seen as a segment sticking out of the mating surface 20 or the second part 19b respectively.

Preferably, but not limiting thereto, the protruding segment comprises a tapered ending 28 for facilitating an even more precise positioning of the filter cartridge 10 during mounting.

In another embodiment according to the present invention, the retracted segment 27 comprises a receiving section 29 and a fixing section 30, whereby the receiving section 29 guides the protruding segment 26 towards the fixing section 30.

Preferably, the receiving section 29 comprising an angular free space for an easier mounting, whereby the fixing section 30 is preferably of a complementary shape to the protruding segment 26, bringing said protruding segment 26 into a fixed position. The fixing section 30 preferably does not comprise an angular free space. Consequently, the fixing section 30 matches the diameter and shape of the protruding segment 26 reaching it.

In FIGS. 12a-12c the aforementioned possible embodiments of the retracted segment 27 are presented.

In FIG. 12a the retracted segment 27 is not provided with a receiving section 29 but only a fixing section 30.

In FIGS. 12a and 12b, the retracted segment 27 continues without interruption to the sheet on which the filter cartridge 10 is mounted. This means, over the entire depth or height of the mating surface 20.

In FIG. 12c on the other hand, the retracted segment 27 does not continue over the entire depth or height of the mating surface 20, but there is a minimum height between said sheet and the fixing section 30. Despite the fact that the retracted segment 27 in FIG. 12c is provided with a receiving section 29 this is not necessarily the case. The tapered section below the retracted segment 27 is not necessarily present either.

In the three aforementioned examples of FIGS. 12a-12c, the protruding sector 26 can possibly have a tapered ending 28.

Figure 9:
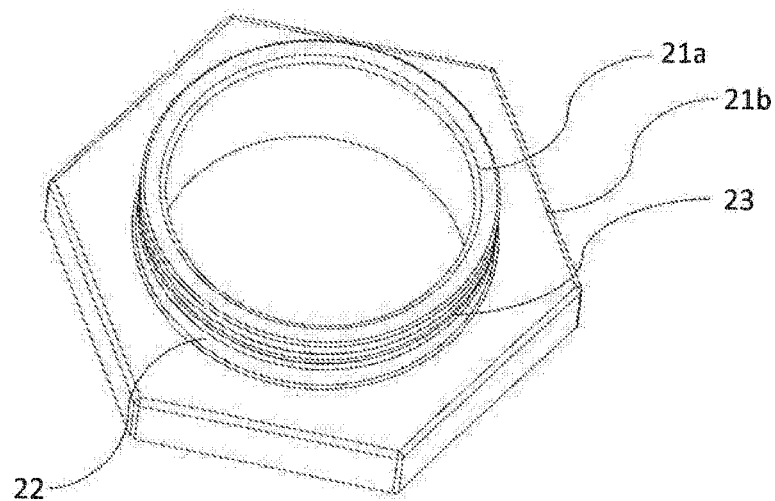

In another embodiment of the present invention, if the outer contour of the second part 19b is not circular, an example of which is shown in FIG. 9, the protruding segment 26 can be positioned on any location between the rim 22 and the outer contour of the second part 19b.

Figure 10:
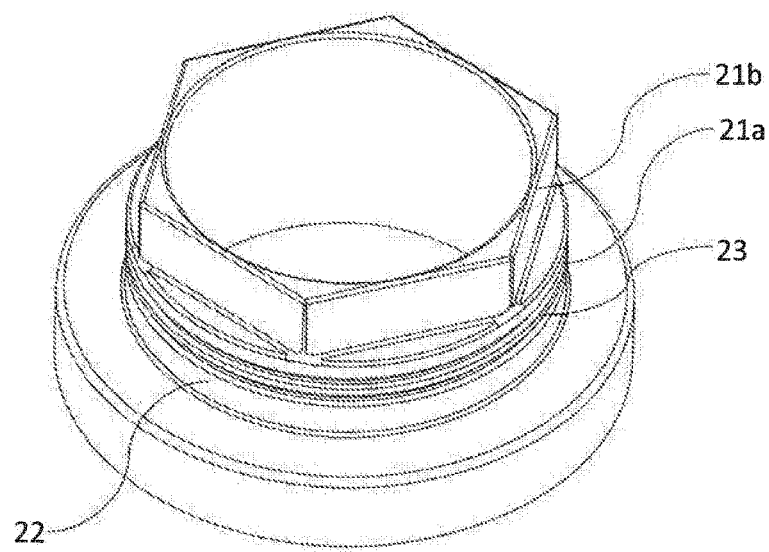

In another embodiment according to the present invention without any limiting nature, the second section 21b can be positioned on the rim 22, as illustrated in FIG. 10. In such case the shape of the second section 21b is preferably realised within the perimeter delimited by the shape of the rim 22. In such case the mating surface 20 comprises a complementary surface receiving the rim 22 and the second section 21b. The second section 21b aligns the filter cartridge 10 in the desired position.

In another embodiment according to the present invention, the second part 19b comprises two or more second sections 21b which increase the robustness of the filter cartridge 10 even more while mounted within the housing 15 and during the operation of the compressor element 2.

Figure 6:
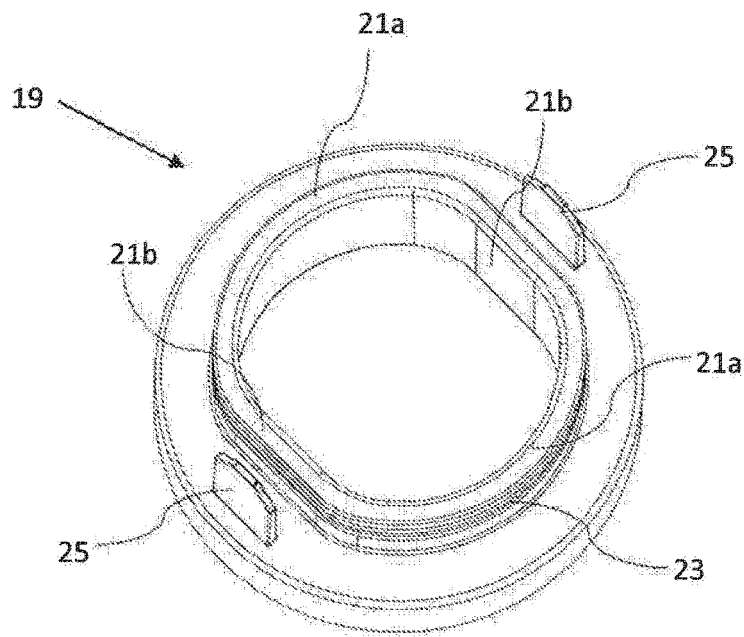
FIGS. 6, 7a and 7b, 8a and 8b, 9 and 10 schematically illustrate a bottom cap according to different embodiments of the present invention.
Figure 7A:
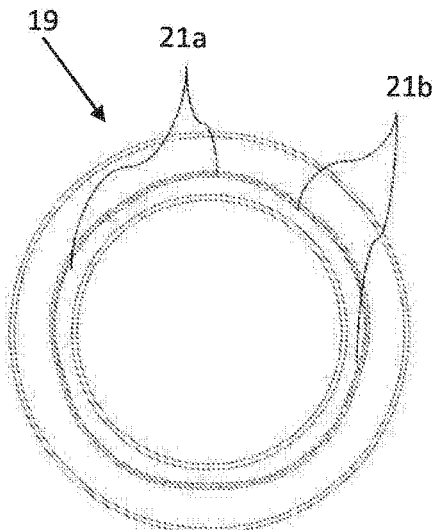
Figure 7B:
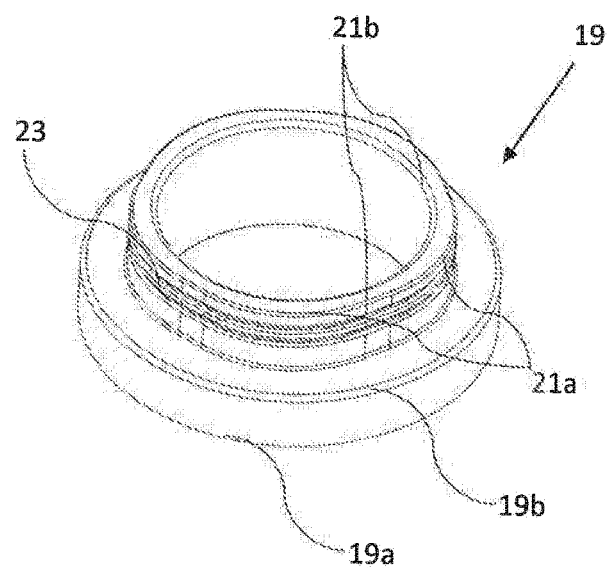

The two or more second sections 21b are positioned at any location on the second part 19b or at a certain interval from each other. If, for example, the second part 19b comprises two second sections 21b, these two second sections 21b can be positioned on opposing parts of the filter inlet 11, as illustrated in FIGS. 6 and 8 or in any other manner.

In a further embodiment according to the present invention, the second part comprises two or more self-aligning units.

Said self-aligning units 25 are positioned next to the second section(s) 21b or at any location on the second part 19b.

Figure 11:
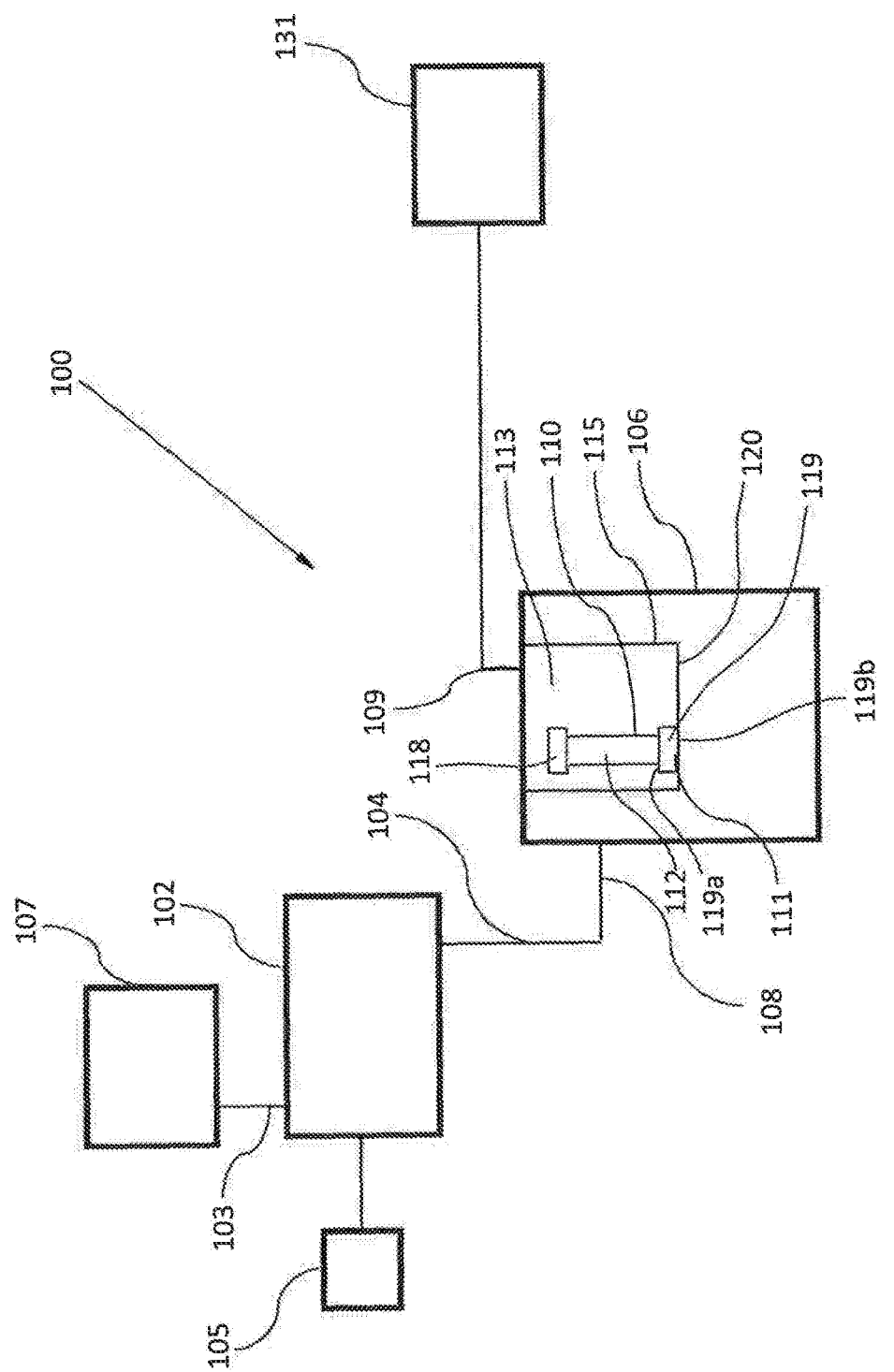
FIG. 11 schematically illustrates a vacuum pump according to an embodiment of the present invention.

Even if the present invention has been explained for the situation in which the filter cartridge 10 is mounted within a compressor 1, it should be understood that the present invention should not be limited to such a situation, and that the filter cartridge can be also mounted within a vacuum pump 100, as illustrated in FIG. 11. It should be understood that such filter cartridge 110 has the same properties, constructional features and functions in the same manner as the filter cartridge 10 mounted within a compressor 1.

Consequently, the vacuum pump 100 comprises a vacuum element 102, with a vacuum inlet 103 and an outlet 104 and is driven by a fixed speed or variable speed motor 105. The vacuum inlet 103 is connected to a user's network 107.

On the vacuum outlet 104, an oil separation vessel 106 is provided, said oil separation vessel 106 having a vessel inlet 108 connected to the vacuum outlet 104 and a vessel outlet 109 connected to an external network 131 or the atmosphere.

Within said oil separation vessel 106, one or more filter cartridges 110 are provided within a housing 115, each of said filter cartridges 110 having a filter inlet 111 and a filter outlet 113 fluidly connected to the vessel outlet 109. Each of the filter cartridges 110 comprises a filter element 112 provided between a top cap 118 and a bottom cap 119.

The bottom cap 119 further comprises a first part 119a receiving the filter element 112 and a second part 119b connected to a mating surface 120 of the oil separation vessel 106.

Further, just like in the case of a filter cartridge 10 mounted within a compressor, the second part 119b comprises a second section 21b.

Depending on the design of the filter assembly 14, the filter assembly 14 can comprise some or even all the technical features presented herein, in any combination without departing from the scope of the invention. 'Technical features' at least means: the number of filter cartridges 10, the position of the filter cartridge 10 within the compressor 1, the second section 21b, the rim 22, the channel 23, the seal 24, the self-aligning unit 25, the protruding segment 26, the retracted segment 27, the tapered ending 28, the receiving section 29 and the fixing section 30.

The present invention is by no means limited to the embodiments described as an example and shown in the drawings, but such a filter cartridge 10 can be realised in all kinds of variants, without departing from the scope of the invention.

The invention claimed is:

1. A filter assembly comprising:
   a housing including a housing inlet configured to be fluidly connected to a compressed gas outlet,
   a housing outlet configured such that purified gas is to be retrieved therefrom,
   a mating surface; and
   a filter cartridge configured to separate a liquid from compressed gas, the filter cartridge provided within the housing and including a top cap, a bottom cap, and a filter element provided between the top cap and the bottom cap, wherein
   the bottom cap includes a filter inlet
   fluidly connected to said housing inlet,
   the top cap and the bottom cap form a circular or predominantly circular guiding system for mounting said filter element,
   the bottom cap further includes:
     a first part configured to receiving receive the filter element,
     a second part connected to the mating surface of the housing, a portion of the second part forming a rim having a height HC, and
     a self-aligning unit,
   the second part of the bottom cap includes first section and a second section, which are part of the rim, the first section having a first shape, and the second section having a second shape different than the first shape, such that the first shape and the second shape prevent the bottom cap from rotating in relation to the mating surface,
   the self-aligning unit being positioned between the rim and an outer contour of the bottom cap,
   the mating surface has a shape corresponding to a shape of the self-aligning unit, and
   the self-aligning unit including at least one protrusion projecting from a surface of the second part and being parallel to the rim.

2. The filter assembly according to claim 1, wherein the second part is relatively circular or oval on a circumference thereof, excluding the second section.

3. The filter assembly according to claim 1, wherein the rim is provided with one or more grooves along a circumference thereof, which are configured to mount one or more seals.

4. The filter assembly according to claim 1, wherein the self-aligning unit is provided on the second part of the bottom cap.

5. The filter assembly according to claim 1, wherein the self-aligning unit forms an integral part of the bottom cap.

6. The filter assembly according to claim 1, wherein the self-aligning unit includes more than one protrusion.

7. The filter assembly according to claim 6, wherein the mating surface includes a retracted segment configured to receive the protrusion.

8. The filter assembly according to claim 6, wherein the protrusion includes a tapered ending.

9. The filter assembly according to claim 7, wherein the retracted segment includes a receiving section and a fixing section, and
   wherein the receiving section is configured to guide the protrusion towards the fixing section.

10. The filter assembly according to claim 1, wherein the second part includes two or more second sections.

11. The filter assembly according to claim 1, wherein the second part comprises two or more self-aligning units.

12. The filter assembly according to claim 1, wherein the second part is detachably connected with the mating surface.

13. A method of using the filter assembly according to claim 1, the method including liquid separation within a compressor or vacuum pump.

14. A liquid separation vessel comprising:
   a filter cartridge configured to separate liquid from gas, the filter cartridge including a top cap, a bottom cap, a filter element provided between the top cap and the bottom cap, and a filter inlet fluidly connected to said vessel inlet;
   a vessel inlet configured to be connected to a source of gas;
   a vessel outlet configured such that purified gas is to be retrieved therefrom, and
   a mating surface, wherein
   the bottom cap includes the filter inlet,
   the top cap and the bottom cap form a circular or predominantly circular guiding system for mounting the filter element,
   the bottom cap further includes:
     a first part configured to receive the filter element,
     a second part connected to the mating surface of the liquid separation vessel, a portion of the second part forming a rim having a height HC, and
     a self-aligning unit,
   the second part of the bottom includes a first section and a second section, which are part of the rim, the first section having a first shape, and the second section having a second shape different than the first shape, such that the first shape and the second shape prevent the bottom cap from rotating in relation to the mating surface,
   the self-aligning unit being positioned between the rim and an outer contour of the bottom cap, the mating surface has a shape corresponding to a shape of the self-aligning unit, and the self-aligning unit including at least one protrusion projecting from a surface of the second part and being parallel to the rim.

15. The liquid separation vessel according to claim 14, wherein the liquid separation vessel is provided with a plurality of the filter cartridges.

16. A compressor comprising:
a compressor element having a gas inlet and a compressed gas outlet,
a liquid separation vessel provided on the compressed gas outlet, the liquid separation vessel including:
a vessel inlet fluidly connected to the compressed gas outlet,
a vessel outlet configured such that purified gas is provided therefrom,
a filter cartridge having a top cap, a bottom cap, a filter inlet fluidly connected to the compressed gas outlet, a filter element provided between the top cap and the bottom cap, and
a mating surface, wherein
the bottom cap includes the filter inlet,
the top cap and the bottom cap form a circular or predominantly circular guiding system for mounting said filter element,
the bottom cap further includes:
a first part configured to receive the filter element,
a second part connected to the mating surface of the liquid separation vessel, a portion of the second part forming a rim having a height HC, and
a self-aligning unit,
the second part of the bottom cap includes a first section and a second section, which are part of the rim, the first section has having a first shape, and the second section having a second shape different from the first shape, such that the first shape and the second shape prevent the bottom cap from rotating in relation to the mating surface,
the self-aligning unit being positioned between the rim and an outer contour of the bottom cap,
the mating surface has a shape corresponding to a shape of the self-aligning unit, and
the self-aligning unit including at least one protrusion projecting from a surface of the second part and being parallel to the rim.

17. A vacuum pump including a vacuum element, the vacuum element comprising:
a vacuum inlet,
a vacuum outlet,
a liquid separation vessel provided on the outlet, and including:
a vessel inlet fluidly connected to the vacuum outlet,
a vessel outlet configured to provide purified gas,
a filter cartridge including a top cap, a bottom cap including a filter inlet, and a filter element provided between the top cap and the bottom cap, and
a mating surface, wherein
the top cap and the bottom cap form a circular or predominantly circular guiding system for mounting said filter element,
the bottom cap includes:
a first part configured to receive the filter element,
a second part connected to the mating surface of the liquid separation vessel, a portion of the second part forming a rim having a height HC, and
a self-aligning unit,
the second part of the bottom cap includes a first section and a second section, which are part of the rim, the first section having a first shape, and the second section, having a second shape different than the first shape, such that the first shape and the second shape prevent the bottom cap from rotating in relation to the mating surface,
the self-aligning unit being positioned between the rim and an outer contour of the bottom cap,
the mating surface having a shape corresponding to a shape of the self-aligning unit, and
the self-aligning unit including at least one protrusion projecting from a surface of the second part and being parallel to the rim.

* * * * *